Patented Aug. 8, 1950

2,518,235

UNITED STATES PATENT OFFICE 2,518,235

HYDROGENATION OF CARBOHYDRATES

Lenze Hartstra, Lubertus Bakker, and Hendrik Adriaan van Westen, Badhuisweg, Amsterdam, Netherlands, assignors to Shell Development Company, San Francisco, Calif., a corporation of Delaware No Drawing. Application December 19, 1946, Serial No. 717,320. In the Netherlands January 7, 1946

14 Claims. (Cl. 260—635)

This invention relates to a process for the production of polyhydric alcohols. More particularly, the invention relates to a process for the production of polyhydric alcohols by the simultaneous hydrolysis and hydrogenation of carbohydrates.

More specifically the invention provides a practical and highly economical method for the production of high yields of polyhydric alcohols from carbohydrates by subjecting the said carbohydrate to a simultaneous hydrolysis and hydrogenation reaction which comprises the incorporation with the reaction medium containing the carbohydrate of a water-soluble metal or ammonium salt and subjecting the said mixture to the action of hydrogen under pressure in the presence of a hydrogenation catalyst and at an elevated temperature.

Polyhydric alcohols such as the six carbon atom polyhydric alcohols resulting from the hydrogenation of glucose and fructose are finding increased importance in industry as substitutes for glycerol in the manufacture of drying oils, lubricants, ointments, etc. An inexpensive source for the production of the polyhydric alcohols are the polysaccharides such as the di-, tri-, and tetra-saccharides and methods have been proposed for the hydrolysis of the polysaccharides to monosaccharides and subsequent hydrogenation of the resulting monosaccharides to the desired polyhydric alcohols. Carrying on separate hydrolysis and hydrogenation processes is cumbersome and expensive and methods for effecting the simultaneous hydrolysis and hydrogenation process for the carbohydrates have been attempted. Such simultaneous reactions meet with difficulty, however, as the hydrolysis reaction proceeds at a slower rate than the hydrogenation reaction and there is obtained a considerable number of products other than the desired polyhydric alcohol of the basic monosaccharides. The speed of the hydrolysis reaction is increased by the introduction of an acid into the simultaneous reaction medium but the presence of large amounts of acids also greatly reduces the yield of the desired polyhydric alcohols and increases the number of by-products. Making the simultaneous reaction medium alkaline also greatly increases the speed of hydrolysis but results in a series of degradation and transformation reactions which give little of the desired polyhydric alcohols in the final product. The known methods for the hydrolysis and hydrogenation of the carbohydrates meet with further difficulties when they are applied to the hydrolysis hydrogenation of the less expensive, higher molecular weight polysaccharides, such as starch and starch decomposition products, as the yields of the polyhydric alcohols are even still lower. Accordingly, a process such as that provided by the present invention for reducing the degradation and transformation reactions and the large amounts of by-products in the simultaneous hydrolysis and hydrogenation of the carbohydrates, especially the less expensive polysaccharides, such as starch and its decomposition products, and resulting in high yields of relatively pure polyhydric alcohols of the basic structural monosaccharides is a great advance in the art.

It is an object of the invention to provide a practical and economical method for the simultaneous hydrolysis and hydrogenation of carbohydrates to polyhydric alcohols. It is a further object to provide a method for the simultaneous hydrolysis and hydrogenation of the carbohydrates which is substantially free of degradation and transformation reactions and which results in high and relatively pure yields of the polyhydric alcohols of the basic structural monosaccharides. It is still a further object of the invention to provide an efficient method for the simultaneous hydrolysis and hydrogenation of the higher molecular weight polysaccharides, such as starch and its decomposition products, to high and relatively pure yields of polyhydric alcohols of the basic structural monosaccharides. Other objects of the invention will be apparent from the detailed description given hereinafter.

It has now been discovered that a simultaneous hydrolysis and hydrogenation of carbohydrates may be conducted in a practical and economical manner substantially free of degration and transformation reactions with an almost substantially complete conversion of the said carbohydrate to polyhydric alcohols of the basic monosaccharides by the novel method of incorporating in the aqueous solution of the carbohydrate one or more hereinafter described water-soluble metal or ammonium salts, and subjecting the mixture to the action of hydrogen under pressure in the presence of a hydrogenation catalyst and at an elevated temperature. It has been further discovered that the higher molecular weight polysaccharides such as starch and its decomposition products can readily be simultaneously hydrolyzed and hydrogenated to high and relatively pure yields of polyhydric alcohols of the basic structural monosaccharides by the same described process of incorporating a water-soluble salt of a metal or ammonia, excluding the alkali salts and nitrous and nitric acid salts, with the higher molecular weight polysaccharide before it is subjected to the hydrogen, hydrogenation catalyst and the prescribed temperature and pressure.

The process of the invention may be broadly described as a method for the simultaneous hydrolysis and hydrogenation of carbohydrates to produce polyhydric alcohols which comprises adding a small amount of a water-soluble metal salt or ammonium salt, such as magnesium chloride, nickel sulfate and antimony trichloride to an aqueous solution or suspension of the carbohydrate and treating the resulting mixture with hydrogen under a pressure of about 50 to about 200 atmospheres, in the presence of hydrogenation catalyst, such as nickel, and subjecting the said mixture to a temperature of between about 160° C. and about 200° C. until the hydrolysis and hydrogenation reaction has been effected to the desired extent. During the reaction the carbohydrate is hydrolyzed to the basic monosaccharides whose aldehyde or keto groups, when released, are hydrogenated to hydroxyl groups to produce the desired polyhydric alcohols of the monosaccharides. Those carbohydrates having free aldehyde or keto groups in their molecular structure before they are subjected to the process of the invention may have these groups hydrogenated at the same time as the molecule is hydrolyzed. At any rate both the hydrolysis and hydrogenation reactions appear to be taking place simultaneously when the di- or higher saccharides are subjected to the process of the invention and the reaction results in the desired polyhydric alcohols of the basic structural monosaccharides.

The term "carbohydrate" as used throughout the specification and appended claims includes the monosaccharides, di-, tri- and tetra-saccharides and those saccharides containing more than four basic monosaccharides which are termed "polysaccharides." Monosaccharides are hydroxy aldehydes or hydroxy ketones having the general formula $C_x(H_2O)_y$ which cannot be hydrolyzed into any simpler carbohydrate. Examples of the monosaccharides which are embraced by the invention are d-arabinose, l-arabinose, l-ribose, d-xylose, l-glucose, d-glucose, d-fructose, l-fructose, d-galactose, d-mannose, l-mannose, l-galactose, l-altrose, d-allose, l-gulose, d-idose, l-talose, etc.

The above-described monosaccharides are the basic structural units of the di-, tri- and tetra-saccharides and the polysaccharides which are formed on the hydrolysis of the higher saccharides and which are hydrogenated to the polyhydric alcohols. Those monosaccharides containing the aldehyde group are hydrogenated almost exclusively by the process of the invention to one product, i. e. a polyhydric alcohol containing the same number of carbon atoms with the same space configuration of units attached to the carbon atoms and with a hydroxyl group attached to the aldehyde carbon atom in place of the oxygen atom. Glucose, for example, is hydrogenated almost exclusively to sorbitol. The monosaccharides containing a keto group in the molecule are hydrogenated to a mixture of approximately equal amounts of two different polyhydric alcohols due to the presence of the asymmetric nature of the ketocarbon atom. Both resulting polyhydric alcohols contain the same number of carbon atoms as the monosaccharide with the same space configuration of units attached to the carbon atoms but one of the polyhydric alcohols has a hydroxyl group on one side of the ketocarbon atom in place of the oxygen atom and the other polyhydric alcohol has the hydroxyl group on the opposite side of the ketocarbon atom in place of the oxygen atom. Fructose, for example, has a keto group at the second carbon atom and the molecule is hydrogenated to approximately equal amounts of sorbitol and mannitol.

The disaccharides are composed of two units of the same or different above-described monosaccharides which are released from the disaccharide molecule by hydrolysis and are hydrogenated to the polyhydric alcohols by the process of the invention. Examples of disaccharides embraced by the invention are sucrose, maltose, lactose, cellobiose, melibiose, etc. The trisaccharides are composed of three units of the same or different monosaccharides and are represented by carbohydrate raffinose. The tetrasaccharides are composed of four units of the monosaccharides which are released from the tetrasaccharide molecule by the process of the invention and hydrogenated to the polyhydric alcohols.

The polysaccharides are composed of a great many of the same or different monosaccharides and when subjected to the process of the invention give up the polyhydric alcohols of the respective monosaccharides. Examples of some of the polysaccharides are starch, starch decomposition products such as dextrin and glucose-sirup, etc. Because of its cheapness, ready availability and ease with which it reacts in the process, starch is the more preferred of the carbohydrates to be used in the simultaneous hydrolysis hydrogenation reaction of the invention.

Mixtures of any of the above-described carbohydrates may also be used in the process of the invention. For example, a mixture of sucrose and starch may be subjected to the simultaneous hydrolysis and hydrogenation process, or a mixture of glucose and dextrin may be used.

The carbohydrate or carbohydrates to be subjected to the process are dissolved in water at the appropriate concentration for the hydrolysis and hydrogenation reaction. The concentrations of the carbohydrates may vary over a very wide range. Concentrations of carbohydrates between 40% to about 70% by weight are particularly favorable for the reaction. Carbohydrate concentrations in the range of 50% by weight, in general, react particularly smooth in the reaction and such concentrations are the more preferred for the process. It is not entirely necessary for the carbohydrates to form true solutions with the water as suspensions and colloidal solutions of the carbohydrates readily react in the process.

Any suitable reduction catalyst may be used as the hydrogenation catalyst in the process of the invention. Examples of such catalysts are metals as platinum, palladium, nickel, copper, iron, cobalt, zinc, lead, tin, mercury, etc., or metallic oxides such as nickel oxide, copper oxide, aluminum oxide, chromium oxide, etc. Other catalysts may be metallic alloys such as copper-chromium alloy, zinc-chromium alloy, nickel-magnesium alloy, etc., and metallic salts such as copper acetate, nickel formate, tin acetate, and the like. Mixtures of catalysts may also be used in the process such as mixtures of nickel and copper, copper and cadmium oxide, nickel formate and nickel-magnesium alloy, etc. In some cases it is advisable to support the catalyst on a carrier such as diatomaceous earth (kieselguhr). Reduced nickel supported on kieselguhr and reduced nickel sulfate or nickel chromate on kieselguhr have proved to be particularly effective and are the preferred catalysts for the simultaneous hydrolysis hydrogenation reaction.

The amount of the hydrogenation catalyst to be used in the reaction may vary over a wide range depending upon the particular type of catalyst, the particular carbohydrate and the specific temperatures and pressures employed in the process. In most cases amounts of catalyst varying from 1% to about 10% by weight of the carbohydrate acted upon should be sufficient for the simultaneous hydrolysis and hydrogenation reaction.

The water-soluble salt added to the reaction medium may be any suitable salt of a weak base and a strong, stable acid boiling above 90° C. at atmospheric pressure. Salts of strong bases such as KOH and NaOH as well as the salts of low-boiling acids such as nitric acid and the unstable acids such as nitrous acid affect the course of the reaction in an unfavorable manner and cannot be used. By the term "water-soluble" as used throughout the specification and appended claims is meant a salt whose solubility in water is sufficiently large enough to produce the concentration of the salts necessary, as discussed above, without the use of extreme and cumbersome amounts of water in the process. Suitable weak bases that may be used to produce the desired water-soluble salts are, for example, any of the hydroxides of heavy metals included between magnesium and copper on the electrometric series such as magnesium hydroxide, zinc hydroxide, chromium hydroxide, iron hydroxide, nickel hydroxide, etc. Representative examples of the strong, stable acids boiling above 90° C. used to produce the water-soluble salts are acetic acid, hydrochloric acid, sulfuric acid, phosphoric acid, etc. Representative examples of the water-soluble salts used in the process of the invention are magnesium chloride, magnesium sulfate, magnesium acetate, calcium chloride, antimony trichloride, stannic chloride, stannous chloride, nickel sulfate, nickel chloride, cadmium chloride, cadmium sulfate, cupric chloride, chromous chloride, ammonium diphosphate and the like. The more preferred of the metal or ammonium salts are magnesium chloride, magnesium sulfate, calcium chloride, nickel chloride, nickel sulfate, ammonium chloride, antimony trichloride and stannous chloride.

The amount of the water-soluble metal or ammonium salt to be added to the reaction medium may vary with the type and concentration of carbohydrates to be acted upon and the type of hydrogenation catalyst but the amount of water-soluble salt, in general, should not exceed 1% by weight of the carbohydrates. Amounts of water-soluble salt as low as about .01% by weight of carbohydrate are in general effective in the process. It has usually been found preferable to use amounts of water-soluble salts within the range of about .2% to about .8% by weight of the carbohydrate in order to obtain maximum yields of the polyhydric alcohols but the exact amount should be determined for each individual case.

The temperature at which the process of the invention may be conducted may vary preferably within the range 160° C. to about 250° C. Higher temperatures may be used under various conditions but temperatures below 160° C. give unsatisfactory results in the process. It may be necessary in some instances, for example, to use higher temperatures when mixtures of carbohydrates are being subjected to the simultaneous hydrolysis and hydrogenation reaction. A more preferred temperature range is 160° C. to about 200° C.

The hydrogen used in the process of the invention is introduced into the reaction chamber under pressure. The pressure may vary somewhat with the nature of the reactants and hydrogenation catalyst but in general it has been found preferable to use a pressure of from about 50 to about 200 atmospheres. A still more preferred pressure range is about 75 atmospheres to about 150 atmospheres. It is to be understood, however, that higher and lower pressures than those prescribed above may be used when deemed necessary or desirable.

The time of reaction for the process of the invention will depend upon the specific carbohydrate or carbohydrates being acted upon, the specific hydrogenation catalyst and pressure, the specific metallic or ammonium water-soluble salt and its concentration and the specific temperature of reaction used throughout the process. Generally the time should be about one hour to about one hour and a half. However, some cases may take longer or shorter periods of time and the reaction should be continued until the hydrolysis and hydrogenation has been completed.

The reactants may be added to the process in any suitable manner or in any suitable order but they all should be added to the chamber before the introduction of the hydrogen under pressure. It may be advisable to first add the water-soluble salt to the aqueous solution or suspension of the carbohydrate and then introduce the hydrogenation catalyst before adding the hydrogen under pressure and commencing heating the mixture to the desired temperature.

The reaction is executed in any suitable type of apparatus enabling intimate contact of the reactants, control of the operating conditions and resistance to the higher pressures involved. The process may be carried out in batch, semi-continuous or continuous operation. When continuous operation is resorted to, reactants continuously withdrawn from the reaction zone are preferably subjected to a substantially continuous product separating operation under conditions enabling the continuous recycling to the reaction zone of separate unreacted materials.

Upon completion of the reaction the polyhydric alcohols may be separated from the reaction mixture, which will generally include a slight amount of unreacted carbohydrate, water-soluble salt and the hydrogenation catalyst, by any suitable means comprising such steps as, for example, filtration, washing, crystallization, solvent extraction, distillation and the like.

As stated hereinabove the process of the invention is characterized by the high yield of relatively pure polyhydric alcohols that it produces. In each case the polyhydric alcohol or alcohols that are produced are the hydrogenated form of the monosaccharides that make up the structure of the carbohydrate. While theoretically there are also present in the results of the process minute quantities of alcohols containing smaller number of carbon atoms than the basic monosaccharide contains and also possibly some acid forms their amount is extremely small and unnoticeable. The final product is almost substantially 100% yield of relatively pure polyhydric alcohol of the monosaccharide making up the structure of the carbohydrate. For example, the product from glucose is substantially sorbitol; from fructose, sorbitol and mannitol, from dextrin, sorbitol; from sucrose, sorbitol and mannitol; from starch, sorbitol, from maltose, sorbitol, etc.

To illustrate the manner in which the simultaneous hydrolysis and hydrogenation process of the invention may be carried out the following examples are given. It is to be understood, however, that the examples are for the purpose of illustration and the invention is not to be regarded as limited to the specific carbohydrate being acted upon or the specific metal or ammonium water-soluble salt, hydrogenation catalyst, temperature or pressure used in the process.

In the examples below a nickel catalyst prepared by precipitating nickel sulfate on kieselguhr was used as the hydrogenation catalyst. The catalyst was prepared by precipitating a solution of nickel sulfate on kieselguhr with the aid of a solution of sodium carbonate and reducing the product obtained in a current of hydrogen after washing with water. The reduced catalyst contained 20% by weight of nickel.

Example I

Approximately 75 parts of starch are suspended in about 125 parts of water to form a colloidal solution. To the solution is added about .5 part of magnesium chloride and the solution thoroughly mixed. The mixture is then placed in an autoclave in the presence of about 7.5 parts of the above-described nickel-kieselguhr hydrogenation catalyst. Hydrogen under pressure of about 100 atmospheres is introduced to the reaction chamber and the mixture is heated at a temperature of about 200° C. for about 75 minutes. The final product after filtration and recrystallization consists of about 100% pure sorbitol.

Example II

To illustrate the results of the hydrolysis and hydrogenation of starch without the presence of the water-soluble salts the following experiment is accomplished. About 75 parts of starch are dissolved in about 125 parts of water to form a colloidal solution. The solution is placed in an autoclave in the presence of about 7.5 parts of the nickel catalyst and hydrogen under pressure of about 100 atmospheres is introduced into the reaction chamber. The solution is heated at a temperature of about 200° C. for about 75 minutes. The final product consists of only about 60% sorbitol and a great variety of different by-products.

Example III

Approximately 75 parts of starch are suspended in about 125 parts of water to form a colloidal solution. To the solution is added about .4 part of nickel sulfate and the solution thoroughly mixed. The mixture is then placed in an autoclave in the presence of about 7.5 parts of the nickel catalyst described above. Hydrogen under pressure of about 100 atmospheres is introduced to the reaction chamber and the mixture is heated at a temperature of about 200° C. for about 75 minutes. The final product after purification consists of about 97% pure sorbitol.

Example IV

Approximately 75 parts of starch are mixed with about 125 parts of water. To the solution is added about .53% by weight of the starch of stannous chloride. The mixture is placed in an autoclave in the presence of the nickel catalyst described above. Hydrogen under pressure of about 100 atmospheres is introduced to the reaction chamber and the mixture is heated to about 200° C. for about one hour and a half. The final product after purification consists of substantially 100% pure sorbitol.

Example V

Approximately 100 parts of maltose are mixed with about 210 parts of water. To the solution is added about .8 part of antimony trichloride. The mixture is placed in an autoclave in the presence of the nickel catalyst. Hydrogen under pressure of about 100 atmospheres is introduced to the reaction chamber and the mixture heated to about 200° C. After the product is purified it consists of substantially 100% sorbitol.

Example VI

About 100 parts of glucose-sirup is mixed with about 210 parts of water. To the solution is added about .7 part of ammonium chloride. The mixture is placed in an autoclave in the presence of the nickel catalyst. Hydrogen under pressure of about 100 atmospheres is introduced to the reaction chamber and the mixture heated to about 200° C. After the product is purified it consists of substantially 100% sorbitol.

Example VII

Following the procedure outlined in Example VI and using .7 part of nickel chloride as the water-soluble salt the following are introduced in the process of the invention to produce substantially 100% sorbitol; dextrin, cellobiose, glucose.

Example VIII

About 75 parts of sucrose is mixed with about 125 parts of water. To the solution is added about .5 part of magnesium sulfate. The mixture is placed in an autoclave in the presence of about 7.5 parts of the above nickel catalyst. Hydrogen under pressure of about 100 atmospheres is introduced to the chamber and the mixture heated for about one hour and a half. The final product is approximately equal quantities of sorbitol and mannitol.

Example IX

Following the procedure and proportions in Example VI starch is hydrolyzed and hydrogenated to substantially 100% sorbitol by the use of .5 part of the following water-soluble salts: magnesium acetate, calcium chloride, stannic chloride, cadmium chloride, cadmium sulfate, cupric chloride, chromium chloride and ammonium diphosphate.

We claim as our invention:

1. A process for the simultaneous hydrolysis and hydrogenation of starch to sorbitol in an aqueous medium which comprises subjecting a mixture consisting essentially of starch, water and about .7% by weight of magnesium chloride based on the weight of carbohydrate present to the action of hydrogen in the presence of a nickel-kieselguhr catalyst under a pressure of about 100 atmospheres and at a temperature of about 200° C.

2. A process for the simultaneous hydrolysis and hydrogenation of starch to sorbitol in an aqueous medium which comprises adding about .01% to about 1% by weight of nickel sulfate to a solution consisting essentially of starch and water and subjecting the said mixture to the action of hydrogen in the presence of a nickel catalyst under a pressure of about 75 to about 125 atmospheres and at a temperature above 160° C. and no greater than 250° C.

3. A process for the simultaneous hydrolysis and hydrogenation of starch to sorbital in an aqueous medium which comprises adding about .01% to about 1% by weight of stannous chloride to a solution consisting essentially of starch and water and subjecting the said mixture to the action of hydrogen in the presence of a nickel catalyst under a pressure of about 50 to about 200 atmospheres and at a temperature above 160° C. and no greater than 250° C.

4. A process for the simultaneous hydrolysis and hydrogenation of a polysaccharide to hexitols in an aqueous medium which comprises adding a salt of a weak base and a stable acid boiling above 90° C. (760 mm. of mercury pressure), to a solution consisting essentially of said polysaccharide and water and subjecting the said mixture to the action of hydrogen under pressure in the presence of a hydrogenation catalyst at a temperature above 160° C. and below the decomposition temperature of the reactants and products.

5. A process for the simultaneous hydrolysis and hydrogenation of polysaccharides to hexitols in aqueous medium which comprises adding about .01% to about 1% by weight of magnesium chloride to the carbohydrate solution and subjecting the said mixture to the action of hydrogen in the presence of a nickel catalyst under a pressure of about 50 to about 200 atmospheres and at a temperature above 160° C. and no greater than 250° C.

6. A process for the direct conversion of carbohydrates to polyhydric alcohols in an aqueous medium which comprises adding a salt of a weak base and a strong, stable acid boiling above 90° C. (760 mm. mercury pressure) to the carbohydrate solution and subjecting the said mixture to the action of hydrogen under pressure in the presence of a hydrogenation catalyst at a temperature of above 160° C.

7. A process for the simultaneous hydrolysis and hydrogenation of a polysaccharide to polyhydric alcohols having six carbon atoms to the molecule in an aqueous medium which comprises adding about .01% to about 1% by weight of a salt of a weak base and a stable acid boiling above 90° C. to the polysaccharide solution and subjecting the said mixture to the action of hydrogen in the presence of a hydrogenation catalyst under a pressure of about 50 to about 200 atmospheres and at a temperature above 160° C. and no greater than 250° C.

8. A process for the simultaneous hydrolysis and hydrogenation of carbohydrates comprising a polysaccharide to hexitols which comprises adding about .01% to about 1% by weight of salt of a weak base and a stable strong acid boiling above 90° C. to a solution consisting essentially of carbohydrate and water and subjecting the said mixture to the action of hydrogen in the presence of a nickel hydrogenation catalyst under a pressure of about 50 to about 200 atmospheres and at a temperature above 160° C. and no greater than 250° C.

9. A process for the single stage conversion of glucose to sorbitol which comprises heating a mixture consisting essentially of glucose, water and about 0.01% to about 1% by weight of magnesium chloride based on the weight of carbohydrate present, at a temperature above 160° C. but below about 250° C. and a pressure of about 50 to about 200 atmospheres, in the presence of hydrogen and a catalyst consisting essentially of nickel and kieselguhr, and separating sorbitol from the reaction mixture.

10. A process for the conversion in a single step of a carbohydrate to a hexitol which comprises heating a mixture consisting essentially of carbohydrate, and water and from about 0.01% to about 1% by weight of a salt of a weak base and hydrochloric acid based on the weight of carbohydrate present, at a temperature above 160° C. but below about 250° C., and under a pressure of about 50 to 200 atmospheres, in the presence of hydrogen and a hydrogenation catalyst, thereby converting said carbohydrate to reaction products consisting essentially of hexitol.

11. A process for the single step conversion of a polysaccharide to a polyhydric alcohol having six carbon atoms to the molecule which comprises heating a mixture consisting essentially of said polysaccharide, water and from about 0.01% to about 1% by weight of a salt of a weak base and hydrochloric acid based on the weight of carbohydrate present, at a temperature above 160° C. but below about 250° C. and at a pressure of from about 50 to about 200 atmospheres, in the presence of hydrogen and a hydrogenation catalyst, and separating polyhydric alcohol having six carbon atoms to the molecule from the reaction mixture.

12. A process for the direct conversion in a single step of starch to sorbitol which comprises, subjecting a mixture consisting essentially of carbohydrates including starch, water, and about 0.01% to about 1% by weight of a salt of a weak base and a stable acid boiling above 90° C. (760 mm. mercury pressure) based on the weight of the carbohydrates present, to the action of hydrogen under pressure in the presence of a hydrogenation catalyst at a temperature above 160° C. but below the decomposition temperature of the reactants and products.

13. A process for the direct conversion of glucose to sorbitol which comprises, subjecting a mixture consisting essentially of glucose, water, a hydrogenation catalyst comprising metallic nickel, and about 0.01% to about 1% by weight of a salt of a weak base and a stable acid boiling above 90° C. (760 mm. mercury pressure) based on the weight of the carbohydrates present to the action of hydrogen under a pressure of about 50 to about 200 atmospheres and at a temperature above 160° C. and no greater than 250° C. and recovering the sorbitol produced from the reacted mixture.

14. A process for the direct conversion of a carbohydrate to hexitols which comprises, subjecting a mixture consisting essentially of carbohydrates, water and about 0.01% to about 1% by weight of a salt of a weak base and a stable acid boiling above 90° C. (760 mm. mercury pressure) based on the weight of the carbohydrates present, to the action of hydrogen under pressure in the presence of a hydrogenation catalyst at a temperature above 160° C. but below the decomposition temperature of the reactants and products.

LENZE HARTSTRA.
LUBERTUS BAKKER.
HENDRIK ADRIAAN van WESTEN.

REFERENCES CITED

The following references are of record in the file of this patent:

UNITED STATES PATENTS

| Number | Name | Date |
|---|---|---|
| 2,292,293 | Rose | Aug. 4, 1942 |
| 2,335,731 | Bottoms | Nov. 30, 1943 |